United States Patent [19]
Ross

[11] Patent Number: 4,510,496
[45] Date of Patent: Apr. 9, 1985

[54] BASEBAND RADAR DOCKING SYSTEM

[75] Inventor: Gerald F. Ross, Lexington, Mass.

[73] Assignee: Sperry Corporation, New York, N.Y.

[21] Appl. No.: 346,700

[22] Filed: Feb. 8, 1982

[51] Int. Cl.³ .................... G01S 13/14; G01S 13/42; G01S 13/70
[52] U.S. Cl. .................... 343/5 BD; 343/7.3; 343/10
[58] Field of Search .......... 343/5 BD, 5 BB, 5 CF, 343/5 LS, 7.3, 7.5, 13 R, 14, 15, 12, 10

[56] References Cited
U.S. PATENT DOCUMENTS 3,690,767  9/1972  Missio et al. ............ 343/5 BD X
3,772,693  11/1973 Allard et al. ............. 343/5 BD
4,063,240  12/1977 Isbister et al. ............ 343/5 BD X

FOREIGN PATENT DOCUMENTS 1285697  8/1972  United Kingdom ............ 343/5 BD

Primary Examiner—Maynard R. Wilbur
Assistant Examiner—John B. Sotomayor
Attorney, Agent, or Firm—Howard P. Terry; Seymour Levine

[57] ABSTRACT

A docking system for positioning a vehicle relative to a selective location employs a baseband communication link between the vehicle and the selected location. Transmitters located at specific points at the selective location are activated upon command from the docking vehicle and synchronized with reference signals radiated therefrom. Time delays between the arrival of each signal radiated by the transmitter and the initiation of a reference signal are determined to establish measures to the different points at the selected location. These measures are then processed to provide relative positioning information.

12 Claims, 8 Drawing Figures

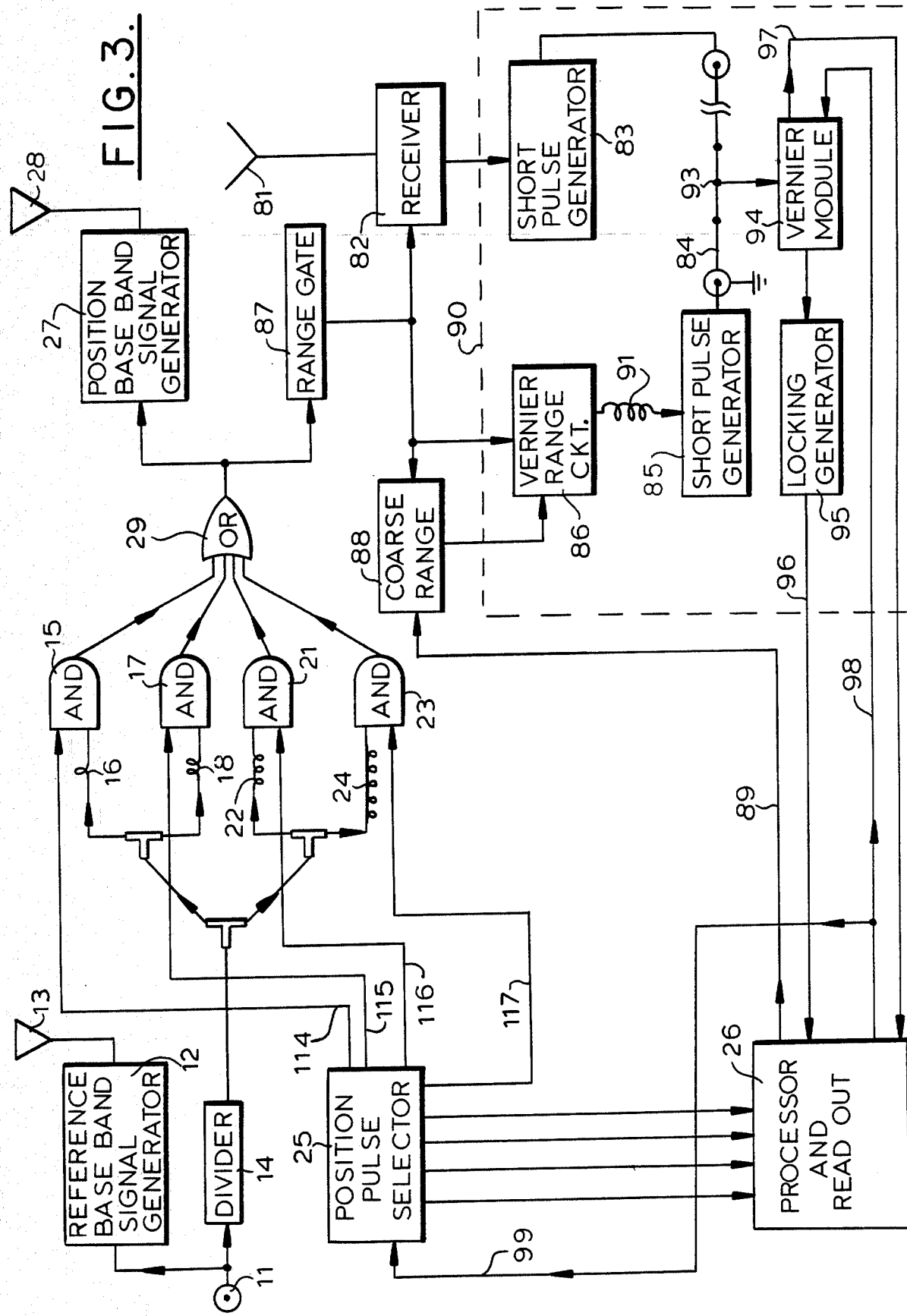

BASEBAND RADAR DOCKING SYSTEM

BACKGROUND OF THE INVENTION

1. Field of the Invention

The invention pertains to apparatus for positioning ships at sea in a predetermined relative manner and more particularly to a short pulse baseband radar and communication system for accurately positioning one ship in a predetermined relative position to that of another ship.

2. Description of the Prior Art

To protect our offshore regions and beaches, tanker ships from Alaska delivering oil to California ports, deposit their cargo in a storage ship anchored distal to the California coast. Attached to the stern of the storage ship is a flexible type pipeline with an oil receptacle at one end supported by a buoy at a distance from the storage ship. This flexible pipeline is used to funnel the oil from the shuttle ship into the tanks of the storage ship. Stored oil is then pumped from the storage ship's tanks to the mainland via a submerged pipeline. To expeditiously transfer the oil from the shuttle ship to the storage ship, it is necessary for the shuttle ship to accurately locate the storage ship and its buoy and position itself to accomplish this transfer with a minimum probability of oil leakage, especially under bad (foggy) weather conditions.

Prior art electronic docking systems such as that disclosed in U.S. Pat. No. 4,063,240 issued Dec. 13, 1977 to Isbister et al and assigned to the assignee of the present invention, are utilized for docking ships adjacent to jetties that are permanently located on shore. In these systems position information is generated by equipment located on the jetty and relayed to the ship for display along with docking commands from the jetty master. A beam signal is radiated from the docking ship and received by a monopulse system to determine the relative angular position of the beacon and by a Doppler system that measures the ship's velocity. A plurality of short baseband pulse radar systems are positioned along the jetty to determine the aspect of the docking ship relative to the jetty. Since the accuracy and repeatability of monopulse systems are sensitive to multipath signals, frequent boresighting and calibration of the equipment is required. This procedure being most frequently necessary on busy jetties where system downtime can least be tolerated.

SUMMARY OF THE INVENTION

A baseband radar docking system embodying the principles of the present invention comprises a transmitter from which a sequence of reference baseband pulse signals are radiated from the docking (shuttle) ship to the docking location (storage ship). A second transmitter, on the docking ship, transmits signals at a reduced rate from that of the referenced transmitter with a time delay selected from a plurality of time delays, from a reference transmission. The reference and delay signals received at the docking location trigger a transmitter at a known location in the coordinate system of the docking location to relay a signal back towards the docking ship. A ranging apparatus coupled to a receiver on the docking ship determines the range between the transmission location on the docking ship and the location of the relaying transmitter by measuring the time interval between the transmission of the delayed baseband pulse signal and the reception of the relayed baseband pulse signal. After a measurement is completed the range information is stored in the processing unit and a trigger is coupled to the delayed pulse transmitter, causing the delay to switch to another time delay. The reference baseband pulse signals and the reduced rate baseband pulse signals, delayed from a baseband pulse of the reference sequence by the newly entered time delay, continue to radiate and a range measurement to a transmitter at a location in the docking location coordinate system corresponding to the newly entered time delay is made as previously described. Range measurements between the transmitter-receiver location on the docking ship to positions in the coordinate system of the docking location continue to be made in this manner until range measurements to all selected positions at the docking location are made. These range measurements are utilized by the processor to calculate the position of the docking ship relative to the docking location and generate docking commands to position the docking ship at the desired location.

BRIEF DESCRIPTION OF THE DRAWINGS

FIG. 3 is a block diagram, partially in schematic form, of the transmission and reception system on the docking ship.

DESCRIPTION OF THE PREFERRED EMBODIMENTS

Figure 1:
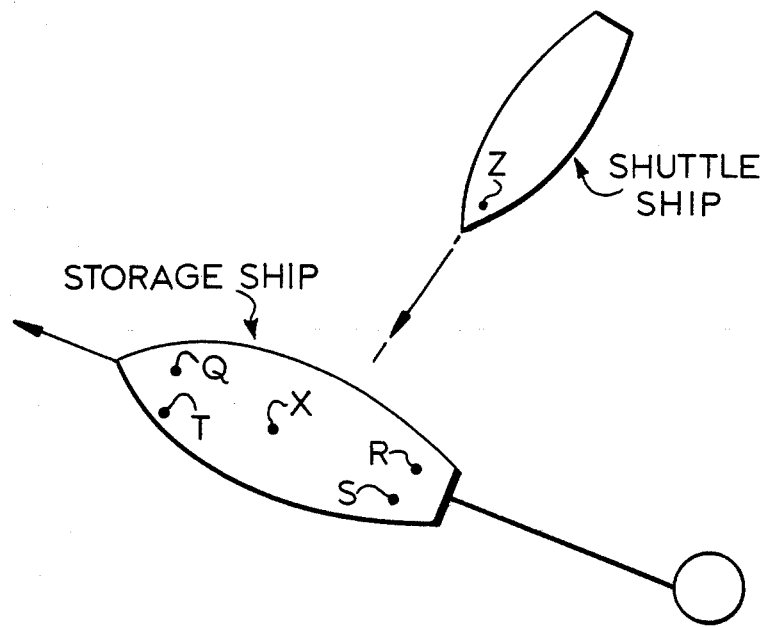
FIG. 1 illustrates diagrammatically relative positionings of receivers and transmitters on the shuttle and storage ships.
Figure 2A:
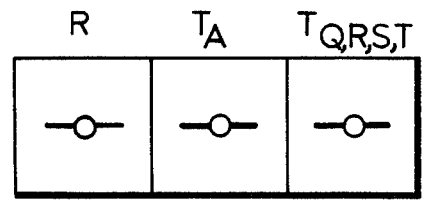
FIG. 2A illustrates possible positioning of transmitters and receivers on the docking ship.

In FIG. 1, a selected position Z on the shuttle ship is the location of a receiver R, a reference transmitter $T_A$, and a position pulse transmitter $T_{Q, R, S, T}$ adjacently positioned as shown in FIG. 2A. A sequence of reference pulses and a second sequence of one of the position pulses, as for example $T_Q$ are transmitted from a shuttle ship and received at the storage ship by an antenna located at a selected position X thereon. These pulses are coupled to logic circuitry which utilize the information contained therein to cause a sequence of pulses to be radiated at an antenna located at a position corresponding to the sequence of position pulses, for this example position Q. These relayed pulses are coupled through the receiving antenna at a position Z and a receiver through a ranging circuit wherein the range between positions Z and Q are determined. The ranges between position Z and positions R, S, and T are sequentially determined in a similar manner. With these known ranges and the known locations of positions Q, R, S, and T in the storage ships coordinate system relative position of the shuttle ship to the storage ship may be accurately determined.

Figure 2B:
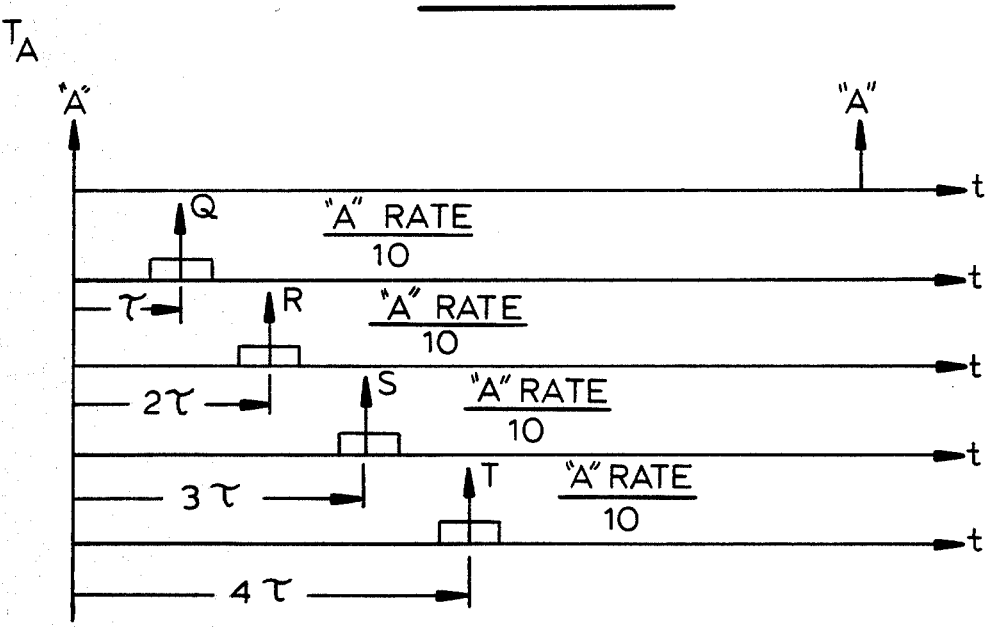
FIG. 2B is a chart illustrating the relative time delays between signals transmitted from the docking ship.

Referring now to FIG. 3, a sequence of trigger pulses from a clock system, not shown, are coupled via terminal 11 to activate baseband signal generator 12 and produce a sequence of reference pulses $T_A$ for radiation from antenna 13 on the docking ship. This sequence of trigger pulses is also coupled to a divider network 14 wherefrom a sequence of pulses at a repetition rate reduced from that of the trigger sequence, as for example 1/10th that of the trigger sequence, are coupled to AND gate 15 via a delay line 16 having a delay $\tau$, AND gate 17 by delay line 18 having a delay $2\tau$, AND gate 21 by a delay line 22 having a delay $3\tau$ and AND gate a3 via delay line 24 having a delay $4\tau$, as represented in FIG. 2B. AND gates 15, 17, 21, and 23 are also coupled to position pulse selector 25 wherein a coded signal is generated in response to a trigger received from processor and read circuit 26 to select one of the delayed reduced repetition rate signals for coupling to position baseband pulse signal generator 27 via OR gate 29. The signals generated by position short pulse generator 27 are radiated from antenna 28 on the docking ship as position signals $T_Q$, $T_R$, $T_S$, and $T_T$ which respectively are delayed from a transmission of a reference pulse from antenna 13 by the delays $\tau$, $2\tau$, $3\tau$, and $4\tau$.

Figure 4:
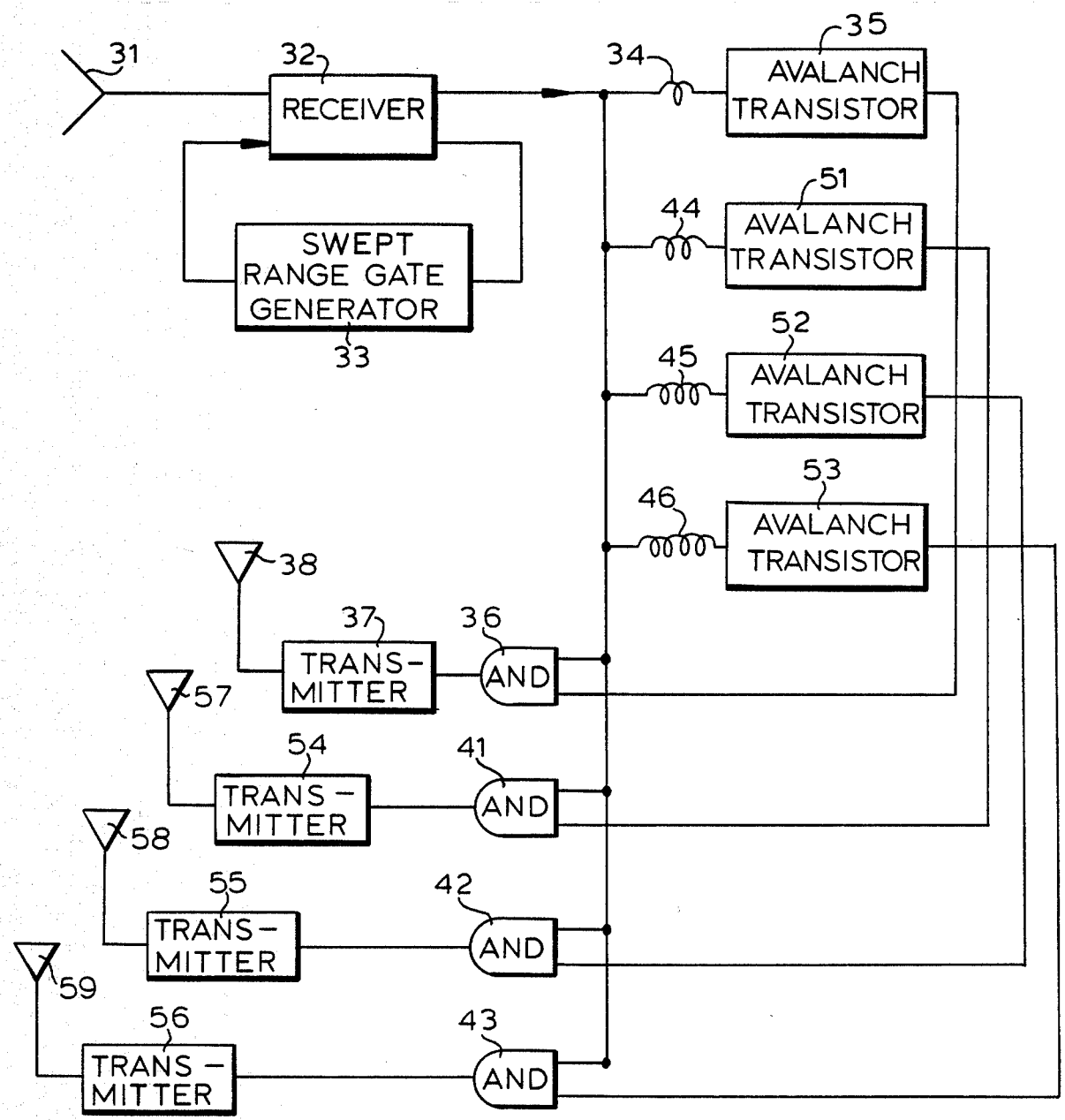
FIG. 4 is a diagram of the transmission and reception system at the docking location.

Referring now to FIG. 4, baseband pulse signal sequences, reference and position, transmitted from position Z on the docking ship are coupled through an antenna 31, located at position X at the storage location, to a receiver 32, which may be of the CFAR type disclosed in U.S. Pat. No. 3,983,422 issued to Nicolson et al on Sept. 28, 1976 and assigned to the assignee of the present invention. This receiver is range gated, with a range gate synchronized to the reference sequence of pulses $T_A$, by a range gate generator 33. A reference signal $T_A$ which arrives at a time of substantially $\tau$ sec prior to the position signal $T_Q$ is coupled through a delay line 34, delayed for a time interval $\tau$ therein, and coupled to the input terminal of an avalanche transistor 35 from which a pulse, of duration somewhat less than the time $\tau$ is coupled to AND gate 36. At a time substantially coincident with the coupling of a pulse from the avalanche transistor 35, the received position baseband pulse signal is also coupled from receiver 32 to AND gate 36 causing an enabling signal to couple therefrom to transmitter 37, thereby providing a baseband pulse signal to the antenna 38 located at a position Q at the docking location for radiation towards the docking ship. In a similar manner relay signals are generated for position signals $T_R$, $T_S$, and $T_T$. This is accomplished by coupling the output of the receiver 32 additionally to AND gates 41, 42, 43, to delay lines 44, 45, and 46 which provide respectively delays of substantially $2\tau$, $3\tau$, and $4\tau$, and coupling avalanche transistors 51, 52 and 53 respectively between delay lines 44, 45, and 46 and a corresponding AND gate 41, 42 and 43. When a position and reference signal appear at the input terminals one of the AND gates 41, 42, or 43, one of the transmitters 54, 55, or 56, that is coupled to the activated AND gate, is triggered, thereby energizing one of the antennas 57, 58 or 59 located at positions R, S, and T respectively at the docking location.

Figure 5:
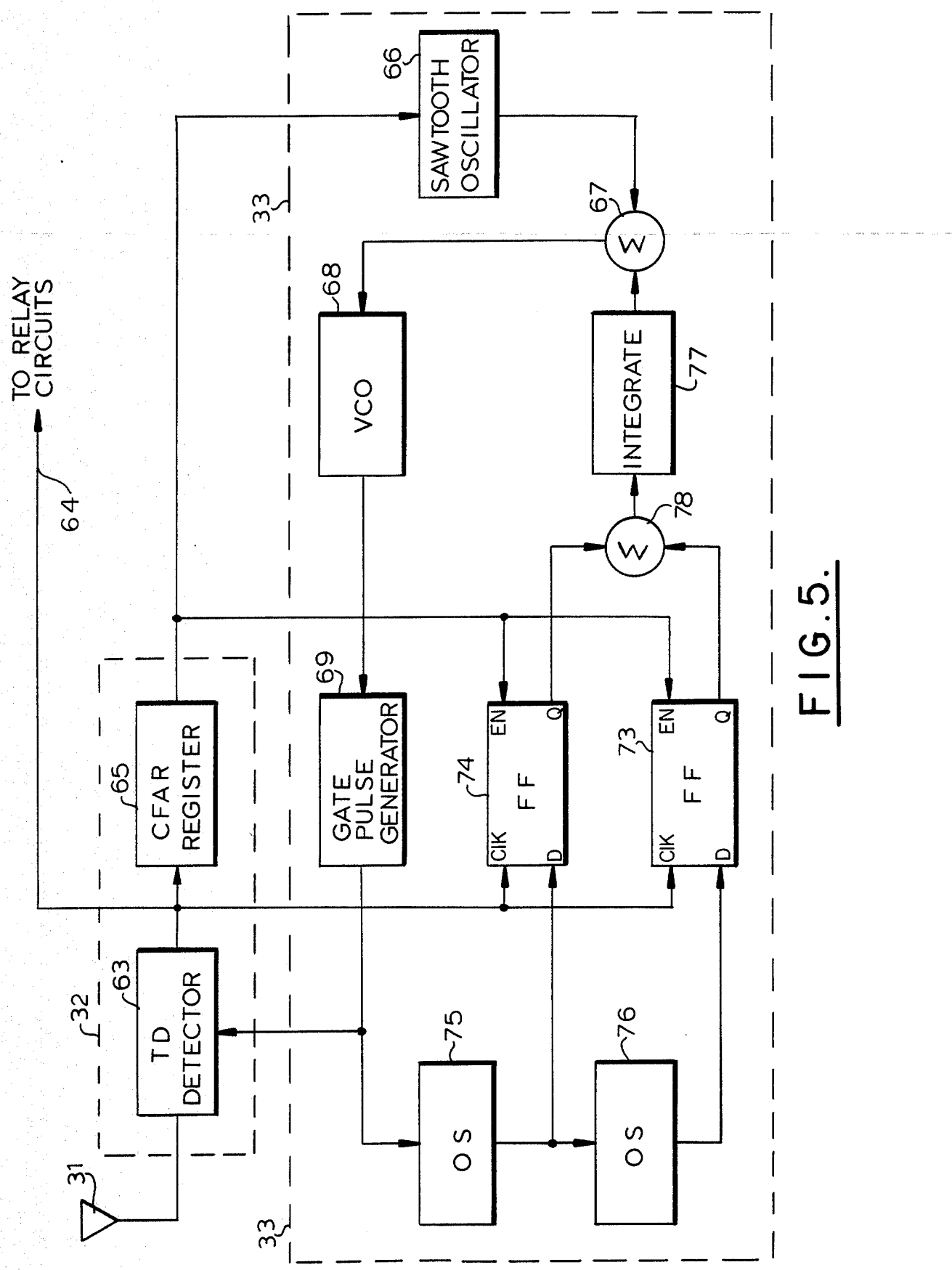
FIG. 5 is a block diagram of a range gate generator that may be used in practicing the invention.

Synchronization of the range gate for receiver 32 with the transmitter reference baseband pulse signals $T_A$ may be accomplished with the circuitry shown in FIG. 5, wherein repeated reference numerals identify components previously cited in FIG. 4. Reference and position baseband pulse signals received by antenna 31 are coupled to the tunnel diode detector 63 of receiver 32 wherefrom detections of the reference and position signals are coupled via line 64 to the relay circuits in FIG. 4, to a CFAR register 65, and the clock terminals of flip-flops 73 and 74. A sawtooth oscillator 66 coupled to the register provides a slowly varying ramp signal via sum circuit 67 to a voltage controlled oscillator 68, the output of which triggers a range gate generator 69. Since the reference baseband pulse signals are generated at a significantly greater rate than the position baseband pulse signals, control of the sawtooth oscillators 66 by the output level of the register 65 is substantially due to the reception of the reference pulse $T_A$. When the output level of the register 65 indicates reception of a preselected number of referenced baseband pulse signals $T_A$ the ramp of the sawtooth oscillator 66 ceases to increase, thereafter maintaining a substantially constant voltage at the voltage controlled oscillator 68. This voltage establishes a repetition rate, with the exception of some fine tuning, yet to be described, for the range gate generator 69 that is substantially in synchronization with the reference signal pulses $T_A$.

The output signal from the CFAR register is also coupled to D-type flip-flops 73 and 74 which are maintained in a disabled state thereby until the predetermined number of $T_A$ reference signals have been detected. The output signal from the range gate generator 69 gates the tunnel diode detector 63 and triggers a one shot 75 that has its output terminal coupled to the D-terminal of flip-flop 74 and to a second one shot 76. One shot 75, triggered at the leading edge of the range gate to commence an early gate interval, couples a high level signal to the D-terminal of flip-flop 74 for half the duration of the range gate. If the tunnnel diode detector 63 detects a signal during this interval and flip-flop 74 is enabled, a positive signal is coupled from the flip-flop 74 to an integrator 77 via a sum circuit 78. The integrated signal is added to the signal from the saw tooth oscillator 66 in the sum circuit 67 and the sum is coupled to VCO 68 to provide the fine positioning of the range gate from the range gate generator 69. At the conclusion of the early gate interval, the trailing edge of the one shot 75 triggers one shot 76 to commence a late gate interval, wherefrom a pulse for the remaining duration of the range gate is coupled to the D-terminal of flip-flop 73. If a signal is detected by tunnel diode detector 63 during this interval, and flip-flop 73 is enabled, a negative signal is coupled to integrator 77 via the sum circuits 78. The integrated negative signal is coupled to the VCO 68 via sum circuits 67 to provide the fine adjustment of the positioning of the range gate from the range gate generator 69.

Referring again to FIG. 3, position pulses transmitted from the storage ship location are received on the docking ship via antenna 81 and coupled therefrom to receiver 82 which may be of the tunnel diode detector type disclosed in the aforementioned U.S. Pat. No. 3,983,422. Output pulses from the receiver 82 are coupled to a short pulse generator 83 in a ranging circuit 90 of the type disclosed in U.S. Pat. No. 3,979,749 issued to Ross et al on Sept. 7, 1976. Operation of the ranging circuit 90 is fully described by Ross et al, briefly; the short pulse generator 83 couples a short pulse through one end of a tapped transmission line 84. The other end of the line receives a pulse from a short pulse generator 85 triggered by a vernier range oscillator 86 via a minimum range determinating delay line 91. Vernier range oscillator 86 is controlled by a range gate generator 87 and coarse range selector 88. Range gates from range gate generator 87 are coupled to receiver 82 and the vernier range oscillator 86 in response to trigger pulses from the output terminal of OR gate 29, while commands for coarse range settings are coupled to the coarse range selector 88 via line 89 from the processor 26. When pulses from short generators 83, 85 coalesce at a tap on transmission line 84, as for example tap 93, a vernier module 94 couples a signal to a locking generator 95 wherefrom a signal indicating that coalescence has occurred is transmitted via line 96 to a processor 26. Vernier module 94 additionally supplies a signal to the processor 26 via line 97 to identify the tap at which coalescence has occurred. After lock on, and the tap at which it has occurred, has been noted by the processor 26 a reset signal is coupled therefrom via line 98 to the vernier module 94 and a signal to select the subsequent position signal with which the next range measurement is to be made is coupled to position pulse selector 25 via line 99.

Figure 6:
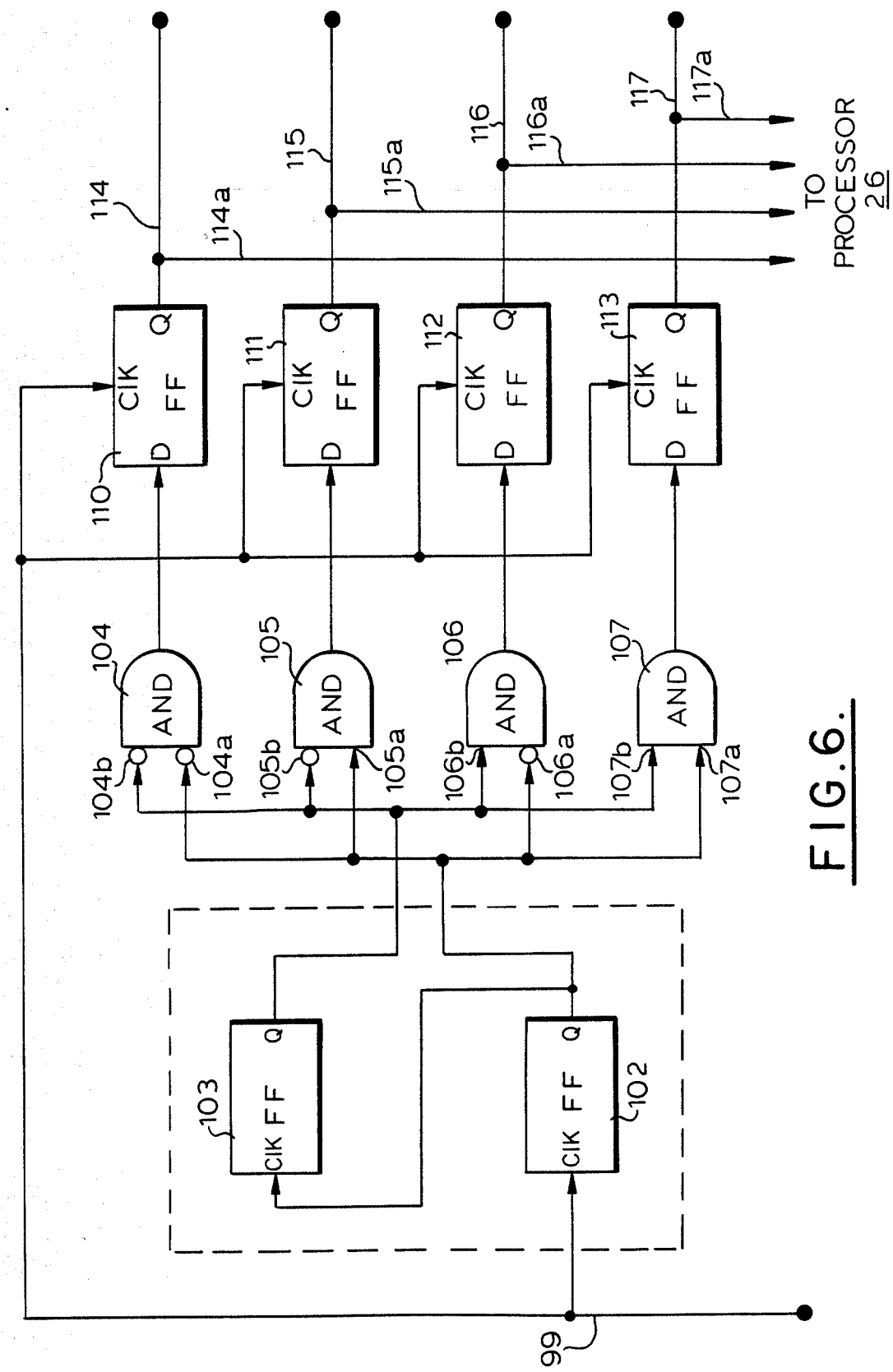
FIG. 6 is a diagram illustrating a particular pulse position selector that may be used in practicing the invention.
Figure 7:
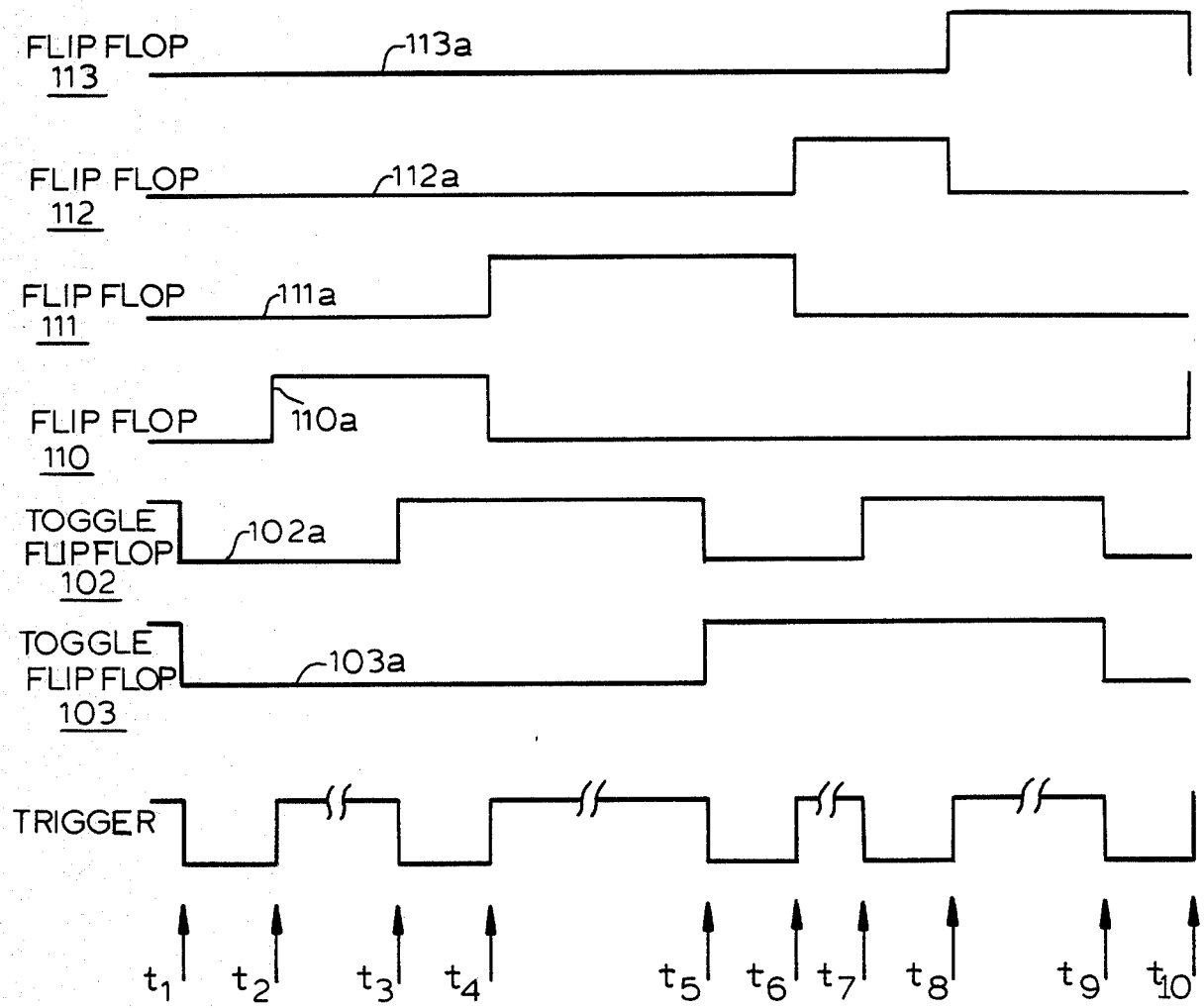
FIG. 7 is a series of waveforms useful in explaining the operation of FIG. 6.

A circuit that may be used as the position pulse selector 25 is shown in FIG. 6. Toggle flip-flops 102 and 103 are set initially in the high state as shown in FIG. 7 prior to $T_1$ on curves 102a and 103a. When a high to low transition of a trigger pulse is coupled via line 99 from processor 26 to the clock terminal of the flip-flop 102 it toggles from a high state to a low state. Since the output terminal of flip-flop 102 is coupled to the clock terminal of flip-flop 103, this high to low transition causes flip-flop 103 also to toggle from a high to a low state thereby coupling a low level signal to the inverter terminals of AND gate 104 causing a high level signal to be coupled from the output terminal thereof to the D-terminal of a D-type flip-flop 110. The low level signals at the output terminals of flip-flops 102 and 103 maintain the output terminals of AND gates 105, 106 and 107, respectively coupled to the D-terminal to D-type flip-flops 111, 112, and 113, in the low level state. The trigger pulse on line 99 is also coupled to the clock terminals of each of the flip-flops 110 through 113 each of which clock at a low to high transmission. At time $T_2$, the transition of the trigger pulse from low to high clocks the high level signal at the D-terminal to the output terminal of flip-flop 110 while low level signals are clocked to the output terminals of flip-flop 111 through 113 as shown on curves 110a through 113a, this coupling on enabling signal via line 114 to AND gate 15. At time $t_3$, the leading edge of the trigger pulse appears causing flip-flop 102 to toggle from a low to high state, thereby coupling a high level signal through inverter terminals 104a and 106a of AND gates 104 and 106 respectively and through terminals 105a and 107a of AND gates 105 and 107 respectively. Since this is a low to high transition flip-flop 103 is not toggled and a low level signal remains at inverter terminals 104b and 105b of AND gates 104 and 105 respectively and at terminals 106b and 107b of AND gates 106 and 107, thus causing a high level signal at the output terminal of AND gate 105 and low level signals at AND gates 104, 106 and 107. At time $T_4$, the low to high transition of the trailing edge of the trigger pulse clocks the high level signal appearing at the D-terminal of D-type flip-flop 111 to the output terminal thereof and the low level signals appearing at the D-terminals of flip-flops 110, 112, and 113 to the output terminals thereof thus coupling a high level enabling signal, via line 115 to AND gate 17. This procedure is continued until all the AND gates 15, 17, 21 and 23 have been enabled and all range measurements have been made. The output state, at each instant of time, of the flip-flops 110 through 113 are coupled by lines 114a through 117a to the processor 26 to identify the one AND gate of AND gates 15, 17, 21 and 23 that is enabled. The total range measurements between location Z on the docking ship to one of the four positions, Q, R, S, or T (see FIG. 1) at the docking location provides sufficient information for the processor 26 to continuously solve for the instantaneous relative position of the docking ship to the docking location.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. A system for guiding a vehicle to a predetermined position at a predetermined location comprising:
    means on said vehicle responsive to a sequence of first trigger pulses for transmitting a sequence of reference baseband pulse signals;
    means on said vehicle and responsive to second trigger pulses for generating a sequence of coded enabling signals;
    means on said vehicle responsive to said sequence of first trigger pulses and said coded enabling signals for transmitting a plurality of position baseband pulse signals time delayed with respect to said reference baseband pulse signals by a time delay selected from a plurality of time delays by one of said coded enabling signals;
    relay means at said predetermined location for transmitting baseband pulse signals therefrom in response to receptions of said reference baseband pulse signals and said position baseband pulse signals;
    ranging means coupled to said code generator means and to receive said baseband pulse signals from said relay means for providing signals representative of transit times between said transmission of said position baseband pulse signals and said signals received from said relay means; and
    means coupled to said ranging means and to said, code generator means for processing said transit time signals from said ranging means to determine relative positions of said vehicle with respect to said predetermined location and for providing said trigger pulses for altering said coded enabling signals upon reception of a transit time representative signal.

2. A system for guiding a vehicle to a predetermined position at a predetermined location in accordance with claim 1 wherein said relay means includes;
    means for receiving said reference and position baseband pulse signals;
    means coupled to said receiver means for providing gating signals at preselected time delays from receptions of said reference pulse signals;
    gate means coupled to said receiver means and said gating signal means for providing signals at output terminals thereof when a position baseband pulse signal and a gating signal are simultaneously coupled thereto; and
    means responsive to said signals at said output terminals of said gate means for transmitting said responsive baseband pulse signals.

3. A system for guiding a vehicle to a predetermined position at a predetermined location in accordance with claim 2 further including range gate means comprising:
- means coupled to said receiver means for generating a ramp signal for a duration determined by a predetermined number of received reference baseband pulse signals;
- oscillator means coupled to said ramp signal means for providing sequences of pulses having repetition rates that are in accordance with signal levels of said ramp signal;
- pulse means responsive to said oscillator means and coupled to gate said receiver means for providing pulses of predetermined duration;
- early-late gate means coupled to said pulse means for generating early pulses triggered by leading edges of pulses provided by said pulse means and having a duration of one half said predetermined duration and for generating late pulses triggered by trailing edges of said early pulses and having durations equal to one half said predetermined duration; and
- means coupled to said early-late gate means, said receiver means, and said oscillator means for providing signals, after said predetermined number of reference baseband pulse signals have been received, to said oscillator means for fine control of said repetition rate in response to said early-late gate pulses and said received reference baseband pulse signals.

4. A system for guiding a vehicle to a predetermined position at a predetermined location in accordance with claim 3 wherein said early-late gate means includes;
- a first one shot having a trigger input coupled to said pulse generator means and an output terminal coupled to said fine control means; and
- a second one shot having a trigger input terminal coupled to said output terminal of said first one shot and an output terminal coupled to said fine control means,
- said first one shot triggered at leading edges of said pulses from said pulse generator means to provide pulses of width equal to one half said predetermined duration of said pulses from said pulse generator means, and said second one shot triggered at conclusions of said pulses from said first one shot to provide pulses of width equal to one half said predetermined duration of said pulses from said pulse generator means.

5. A system for guiding a vehicle to a predetermined position at a predetermined location in accordance with claim 4 wherein said fine control means comprises:
- a first D-type flip-flop having a D-terminal coupled to receive pulses from said first one-shot, clock and enable terminals coupled to said receiver means, and an output terminal;
- a second D-type flip-flop having a D-terminal coupled to receive pulses from said second one-shot, clock terminal and a enable terminals coupled to said receiver means, and an output terminal;
- means coupled to said output terminals of said first and second flip-flops for providing integration signals representative of integrated values of signals at said first and second flip-flop output terminals; and
- means coupled to said oscillator means and to receive said integration and said ramp signals for providing signals to said oscillator means representative of sums of said integration signals and said ramp signals.

6. A system for guiding a vehicle to a predetermined position at a predetermined location in accordance with claim 2 wherein said receiver means includes a receiver antenna mounted at a selected place in said predetermined location and said transmitter means includes a plurality of antennas mounted at selected distances from said receiver antenna.

7. A system for guiding a vehicle to a predetermined position at a predetermined location in accordance with claim 1 wherein said reference baseband pulse signals are transmitted at a first repetition rate and said position baseband pulse signals are transmitted at a second repetition rate, said first repetition rate being greater than said second repetition rate.

8. A system for guiding a vehicle to a predetermined position at a predetermined location in accordance with claim 7 wherein said relay means includes;
- means for receiving said reference and position baseband pulse signals;
- means coupled to said receiver means for providing gating signals at preselected time delays from receptions of said reference pulse signals;
- gate means coupled to said receiver means and said gating signal means for providing signals at output terminals thereof when a position baseband pulse signal and a gating signal are simultaneously coupled thereto; and
- means responsive to said signals at said output terminals of said gate means for transmitting said responsive baseband pulse signals.

9. A system for guiding a vehicle to a predetermined position at a predetermined location in accordance with claim 8 further including range gate means comprising:
- means coupled to said receiver means for generating a ramp signal for a duration determined by a predetermined number of received referenced baseband pulse signals;
- oscillator means coupled to said ramp signal means for providing sequences of pulses having repetition rates that are in accordance with signal levels of said ramp signal;
- pulse means responsive to said oscillator means and coupled to gate said receiver means for providing pulses of predetermined duration;
- early-late gate means for generating early pulses triggered by leading edges of pulses provided by said pulse means and having a duration of one half said predetermined duration and for generating late pulses triggered by trailing edges of said early pulses and having durations equal to one half are predetermined duration; and
- means coupled to said early-late gate means, said receiver means, and said oscillator means for providing signals, after said predetermined number of reference baseband pulse signals have been received, to said oscillator means for fine control of said repetition rate in response to said early-late gate pulses and said received reference baseband pulse signals.

10. A system for guiding a vehicle to a predetermined position at a predetermined location in accordance with claim 9 wherein said early-late gate means includes;
- a first one shot having a trigger input coupled to said pulse generator means and an output terminal coupled to said fine control means; and a second one shot having a trigger input terminal coupled to said output terminal of said first one shot and an output terminal coupled to said fine control means, said first one shot triggered at leading edges of said pulses from said pulse generator means to provide pulses of width equal to one half said predetermined duration of said pulses from said pulse generator means, and said second one shot triggered at conclusions of said pulses from said first one shot to provide pulses of width equal to one half said predetermined duration of said pulses from said pulse generator means.

11. A system for guiding a vehicle to a predetermined position at a predetermined location in accordance with claim 10 wherein said fine control means comprises:

a first D-type flip-flop having a D-terminal coupled to receive pulses from said first one-shot, clock and enable terminals coupled to said receiver means, and an output terminal;

a second D-type flip-flop having a D-terminal coupled to receiver pulses from said second one-shot, clock and enable terminals coupled to said receiver means, and an output terminal;

means coupled to said output terminals of said first and second flip-flops for providing integration signals representative of integrated values of signals at said first and second flip-flop output terminals; and means coupled to said oscillator means and to receive said integration and said ramp signals for providing signals to said oscillator means representative of sums of said integration signals and said ramp signals.

12. A system for guiding a vehicle to a predetermined position at a predetermined location in accordance with claim 11 wherein said receiver means includes a receiver antenna mounted at a selected place in said predetermined location and said transmitter means includes a plurality of antennas mounted at selected distances from said receiver antenna.

* * * * *